United States Patent
Chmara et al.

(10) Patent No.: US 9,280,758 B2
(45) Date of Patent: Mar. 8, 2016

(54) METHOD AND APPARATUS FOR MANAGING MEMBERSHIP OF DYNAMIC VIRTUAL GROUPS

(75) Inventors: Thomas Chmara, Richmond (CA); Guy M. Duxbury, Nepean (CA); Alan Graves, Kanata (CA); Brian Vezza, Allen, TX (US)

(73) Assignee: AVAYA INC., Basking Ridge, NJ (US)

( * ) Notice: Subject to any disclaimer, the term of this patent is extended or adjusted under 35 U.S.C. 154(b) by 1246 days.

(21) Appl. No.: 11/612,692

(22) Filed: Dec. 19, 2006

(65) Prior Publication Data

US 2008/0147796 A1 Jun. 19, 2008

(51) Int. Cl.
*G06F 15/16* (2006.01)
*G06Q 10/10* (2012.01)
*H04L 29/08* (2006.01)

(52) U.S. Cl.
CPC .......... *G06Q 10/10* (2013.01); *H04L 29/08072* (2013.01)

(58) Field of Classification Search
CPC ................ H04L 29/08072; G06Q 10/10
USPC ................................. 709/205, 204
See application file for complete search history.

(56) References Cited

U.S. PATENT DOCUMENTS

| | | | | | |
|---|---|---|---|---|---|
| 7,451,023 | B2 * | 11/2008 | Appleby | ............. | G05D 1/0088 |
| | | | | | 701/120 |
| 2003/0078972 | A1 * | 4/2003 | Tapissier | ............. | H04L 12/1822 |
| | | | | | 709/204 |
| 2004/0225716 | A1 * | 11/2004 | Shamir | ............. | G06F 17/30873 |
| | | | | | 709/204 |
| 2006/0173936 | A1 * | 8/2006 | Castro | .................... | G06Q 10/10 |
| 2007/0192410 | A1 * | 8/2007 | Liversidge | ............. | G06Q 10/10 |
| | | | | | 709/204 |

* cited by examiner

*Primary Examiner* — Dustin Nguyen
*Assistant Examiner* — Joel Mesa
(74) *Attorney, Agent, or Firm* — Anderson Gorecki & Rouille LLP (57) ABSTRACT

A method and system is provided that may be used to dynamically modify membership of a collaboration group participating in a collaboration session using dynamic situational information associated with collaboration session and/or collaboration group member candidates. The dynamic situational information may include collaboration session information, environmental information and context information. A change in collaboration session purpose may trigger a modification of group membership in accordance with a concomitant change in group membership criteria. A change of situational information associated with any group member candidate may trigger the modification of group membership, to add or delete the candidate from the group. The method and apparatus of the present invention may advantageously be embodied in a service that is used by existing communication and collaboration systems to enhance workflow efficiency by exploiting system knowledge to improve the use of resources, reduce the incidence of errors and eliminate redundancy.

24 Claims, 6 Drawing Sheets

METHOD AND APPARATUS FOR MANAGING MEMBERSHIP OF DYNAMIC VIRTUAL GROUPS

FIELD OF THE INVENTION

This invention relates generally to communications and more particularly to a method and apparatus for managing membership of dynamic virtual groups.

BACKGROUND OF THE INVENTION

It is often desirable to identify a group of individuals or other resources for communication and/or collaboration session characteristics, where collaboration involves the direction of the efforts and capabilities of a group towards a common goal. Communication between collaborating group members is essential to the prompt achievement of the goal as it can ensure individual resources are appropriately directed and minimize duplication of efforts.

U.S. patent Ser. No. 11/303,989, entitled "Method and System for Enhancing Collaboration, filed Dec. 19, 2005 by Raymond Wallace, et al. and incorporated herein by reference describes a system for identifying collaborators that are needed to respond to a triggering event and inviting the collaborators to participate in a collaboration associated with the triggering event. The collaborators are identified using existing data regarding available resources. Collaborators are given the option of participating in the effort, and appropriate communication links are established between members of the collaboration group.

Although the above method is useful for identifying a group for collaboration session characteristics, the membership of the collaborating group is defined based on static data structures and decisions that are made at the point in time that the collaboration is established. However, as the collaborative group perseveres toward the goal, events may occur that make it desirable to vary resource participation; e.g. to create a new related or disjoint group. It would be desirable to identify a method and system for dynamically controlling group membership for collaborative and other communication purposes.

SUMMARY OF THE INVENTION

A method for dynamically controlling group membership in a collaborative session uses dynamic situational information to determine whether session membership should be modified. The situational information includes environmental information and contextual information related to a candidate for the collaborative session, where the contextual information includes but is not limited to candidate location, candidate role and candidate security status. The situational information giving rise to a change in group membership may also include a change in a purpose of the collaborative session. Session membership is selectively modified in response to changes in situational information. With such an arrangement, session membership can be dynamically adapted to accommodate fluctuations in resource availability and need.

According to one aspect of the invention, a method for managing membership in a collaborative session includes the steps of monitoring situational information associated with a group candidate to detect a situational trigger, the group candidate being associated with a collaborative session; and modifying a membership of the session in response to the situational trigger.

According to a further aspect of the invention, an apparatus for controlling group candidate membership in a collaborative session includes means for monitoring environmental information associated with the collaborative session, means for monitoring a purpose of the collaborative session and means for monitoring contextual information of group candidates associated with the collaborative session. Event detection logic is provided for detecting changes to at least one of the environmental, purpose and contextual information; and membership modification logic is provided for selectively modifying membership of group candidates associated with the collaborative session in response to the event detection logic.

DETAILED DESCRIPTION

The present invention is directed at a method and apparatus that may be used to dynamically modify membership of a group participating in a collaboration session using dynamic situational information associated with at least one of the collaborative session and group member candidates, where candidates (human, equipment or any other entity) may be individuals or other groups of candidates. The dynamic situational information associated with the collaboration session includes changes in characteristics of the collaboration session, where the change in characteristic may include a change in purpose, scope, workflow, duration, membership criteria or other characteristic which may make it desirable to alter group membership in the collaboration session. The dynamic information associated with the group member candidates includes but is not limited to environmental information and context information. A change of situational information associated with any group member candidate may trigger the modification of group membership for a collaboration session, wherein the modification of membership includes the creation or deletion of group members participating in the collaboration session, and the creation or deletion of an entire group for participating in the collaboration session, or the creation or deletion of a new group for participating in a new collaboration session. The method and apparatus of the present invention may advantageously be embodied in a service that is used by existing communication and collaboration systems to enhance workflow efficiency by exploiting system knowledge to improve the use of resources, reduce the incidence of errors and eliminate redundancy.

According to one aspect of the invention, a group membership management service is provided which monitors situational information associated with group candidates and collaborative purpose to detect situational triggers that may require modification to candidate membership in a given communication or collaboration session. In one embodiment, group membership is automatically updated in response to the situational triggers to ensure that the most appropriate candidates are included in the group communication/collaboration session to reflect current resource availability and need. Automating the process in this manner eliminates the need for time consuming manual management, reduces the incidence of errors and facilitates collaboration between group participants to advance processes of a work flow.

In an alternate embodiment, the detection of situational triggers may result in notifications being sent to an administrator of the communication or collaboration session, to permit a session controller to control the modification of group membership, and thereby synchronize the membership modifications with the workflows of the session. In one embodiment it is also envisioned that a decision making entity in the group membership management service may use heuristics, inference algorithms or other logic when determining whether to add or delete members from a group.

Figure 1:
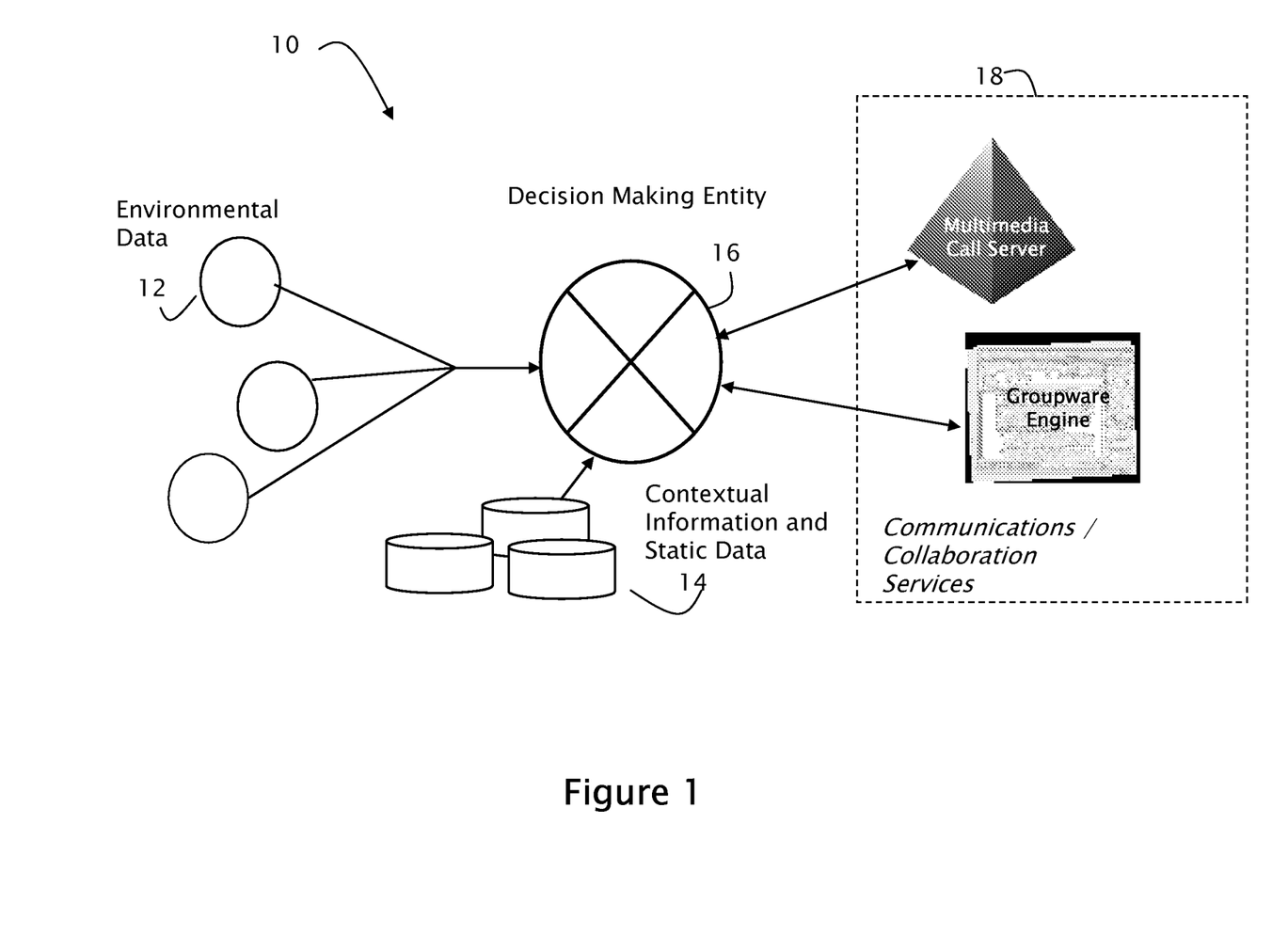
FIG. 1 is a diagram that illustrates several components of a dynamic group membership management service of the present invention.

FIG. 1 illustrates several representative components that may be included in a group membership management service 10 of the present invention. For the purpose of the below discussion, a 'collaboration session' shall mean a particular collaboration or communication participated in by one or more group members. Each collaboration session may include on or more workflows, with each workflow including one or more tasks. The present invention allows group membership to be dynamically controlled at a task granularity, taking into consideration the resource needs and availability within a collaboration session and across multiple collaboration sessions.

Within each collaboration session there may be one or more sub-sessions in which sub-sets of the group members participate on various tasks associated with the collaboration session. Within any collaboration it is appreciated that group members may use different communication mechanisms to participate in the collaboration session. For example, a collaborative session may be established between candidates, some which utilize a voice conference and some of which receive textual communications using voice to speech translation. In addition, an individual group member may use different communication mechanisms at various points within the collaboration depending upon user preferences, environmental and contextual information. Accordingly the present invention is not limited to any particular type or number of communication mechanisms being used within the collaboration sessions.

A 'candidate' shall be an entity that is available to participate in a collaboration session. The candidate may be any type of resource, including a human, animal or mechanical resource. Exemplary methods by which a candidate is initially solicited to participate in a session are disclosed in U.S. patent Ser. No. 11/303,989, entitled "Method and System for Enhancing Collaboration, entitled "Method and System for Enhancing Collaboration", filed Dec. 19, 2005 by Raymond Wallace, et al, incorporated by reference above. After initial selection the present invention manages group membership to ensure that appropriate candidates are added to or removed from a collaboration session, taking into account dynamic situational information.

Central to the group membership management service 10 is a decision making entity 16. The decision making entity 16 communicates with communication or collaboration services 18 which may include a multi-media call server, group ware engine or any server or engine which permits numbers of candidates to communicate, collaborate or otherwise be cooperative. The decision making entity 16 receives environmental input from environmental monitoring devices 12, contextual and static data from devices 14, and notifications of changes to purpose collaboration session characteristics from the collaboration services 18. In one embodiment notifications of changes to collaboration session characteristics may be manually or automatically provided by the collaboration services 18, as indicated in FIG. 1. In an alternate embodiment, the event detection and decision logic may utilize heuristics or inference algorithms to determine whether group membership criteria should be modified. For example, such algorithms may use information regarding an operation performed by the collaboration session which indicates an approaching end to the usefulness of certain group members (for example, the downgrade of severity of an emergency may cause the members of the collaborative group to be changed). The present invention is not limited to any particular manner of determining that group membership criteria should be changed.

The environmental monitoring devices 12 may include, for example, existing environmental monitoring devices such as those used in first-response and healthcare environments, and may include fire alarms, smoke detection devices and other monitoring devices which provide information regarding a physical environment.

As mentioned above, the decision making entity 16 also receives contextual and static data from repositories and monitoring devices 14. The contextual and static data is generally but not exclusively related to one or more group candidates. For example, the contextual information could include location, role and security status information for each group candidate, among other information. Location information may be provided by presence services generally known in the art. Changes in location may amount a change in situational information that would cause group membership for a session to be updated. For example, in a disaster response scenario, a group may be created to include those in proximity to the disaster—the radius of that area to be adjusted as conditions change. As a candidate's location changed to one within range of a disaster, the candidate may be included in the group (for example, to receive emergency communications). As the radius of the area is modified, the purpose or nature of the collaboration changes and thus the criteria of membership for the particular collaboration concomitantly changes.

Context information may also include role information. The role of a candidate is generally associated with the session in which the candidate is participating. For example, a candidate that is a fire rescue employee may have a different role in a collaboration session associated with a disaster response than the same candidate may have for a general communication session.

Context information may further include status information and/or security status information. Status information may be used to for determining task assignment, for example if the resource is 'busy' in a work-flow, the resource may not be available to be a member of a group, but a change in status may make the resource more desirable. Security status information may control the types of communications that will be visible to different participants in a group. A candidate may not be eligible for a group if the security status of the candidate is insufficient. Should a disaster event occur, information can be kept from those with inappropriate clearance. However, the present invention allows candidates of sufficient security status that encounter the session to optionally be automatically included in the collaboration and communications to allow information to quickly be disseminated to those determined to be best suited to utilize the information.

It should be noted that although contextual information such as role, location and security status are provided by way of example, the present invention is not limited to the contextual keys disclosed herein. Rather, any context information which may be used to determine whether it is appropriate to include a candidate in a collaboration group may be substituted herein. In addition, it is envisioned that the types of context keys deemed to be of interest to cooperative services may be added or deleted as candidate descriptors, using object oriented programming techniques known to those of skill in the art. Thus it can be appreciated that the present invention is not limited to the use of any particular context keys.

Static information may include pre-configured knowledge sources, such as employee data bases, topology data bases, historical team metrics, and the like. Such records, although generally 'static' are subject to update, and thus the update of a static record give rise to an 'event' that may be determined to be of sufficient importance to modify group membership by the decision making entity 16.

Figure 2:
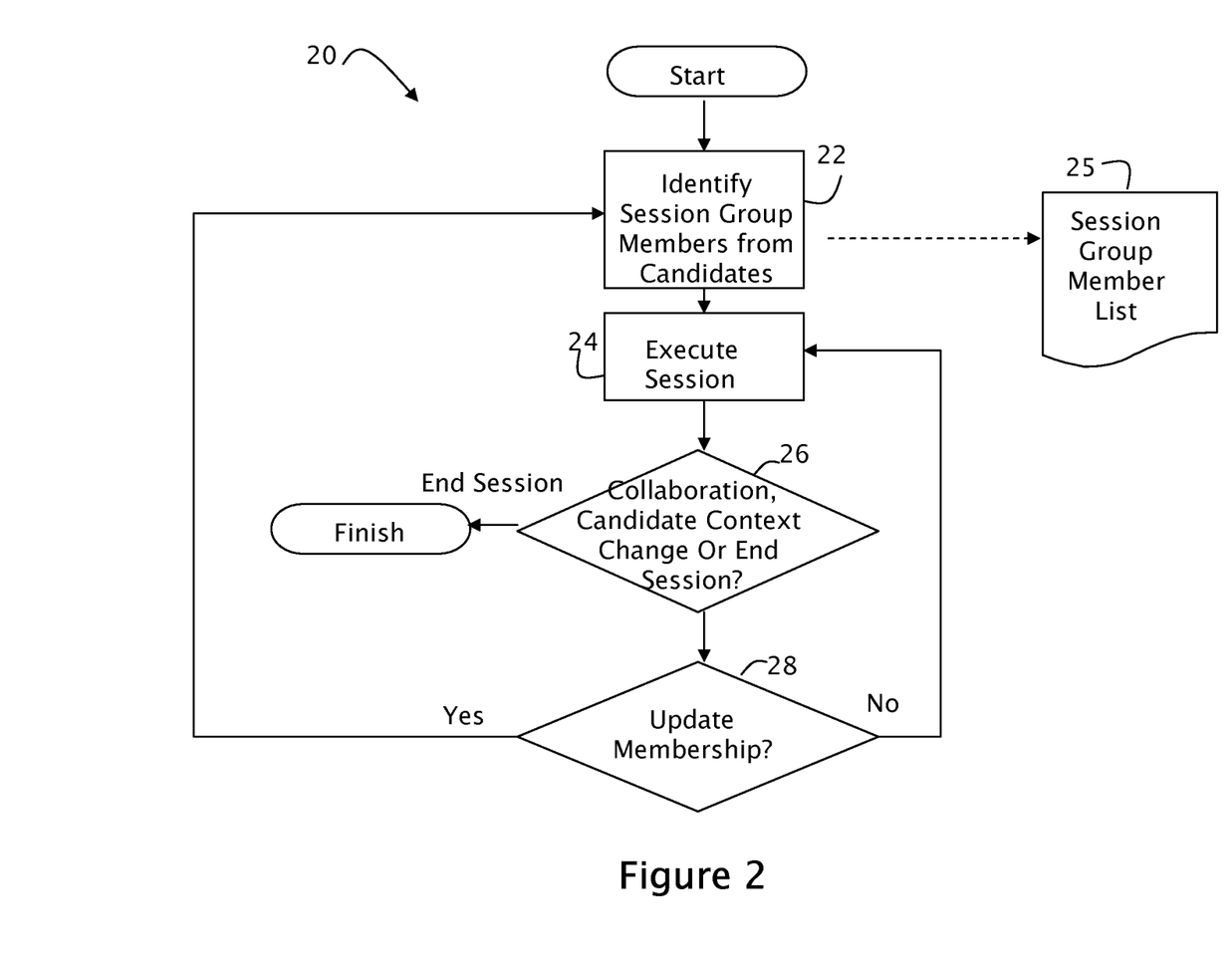
FIG. 2 is a flow diagram illustrating exemplary steps that may be performed to manage membership of dynamic groups according to principles of the present invention.

Referring now to FIG. 2, a flow diagram is provided that details exemplary steps that may be performed in a process 20 for dynamically managing group membership according to principles of the present invention. At step 22 a collaboration session is initialized and an initial group of members for the collaboration session is identified (session group member list 25) using mechanisms known in the art. At step 24 the collaboration session is initiated, with members exchanging communications as needed to advance the workflow of the collaboration. During this time, situational information such as collaboration session characteristics, environmental conditions, candidate context and static data are monitored. At step 26, an event is detected, where the event is a change in one of the collaboration session characteristics, environmental, context or static data that is associated with candidates of the collaboration session. At step 28, the decision making entity reviews the event, and determines whether the event is one which should result in a modification of group membership for the collaboration session. It may be that the event is one that is determined (using heuristics or the like) to not be sufficient to cause group membership to be changed. If so, the process returns to step 24, and the execution of the collaboration session with the identified group member candidates continues.

However, if it is determined that the event warrants modification of group membership for the collaboration session, then at step 28 the process returns to step 22, where a new session group member list 25 is identified. The exact manner in which the new candidate information results in an update of the list is one which is dependent upon the particular workflow of the collaboration session and the detected change in situational information of the collaboration session, and the present invention is not limited to any particular type of modification of group membership. The decision as to how to manage group using the situational information may be made using heuristics, dynamic policy or inference algorithms. In addition, as mentioned above, the decision as to how to manage groups may be a function performed by the decision mechanism, or may be performed by a session manager.

Figure 3:
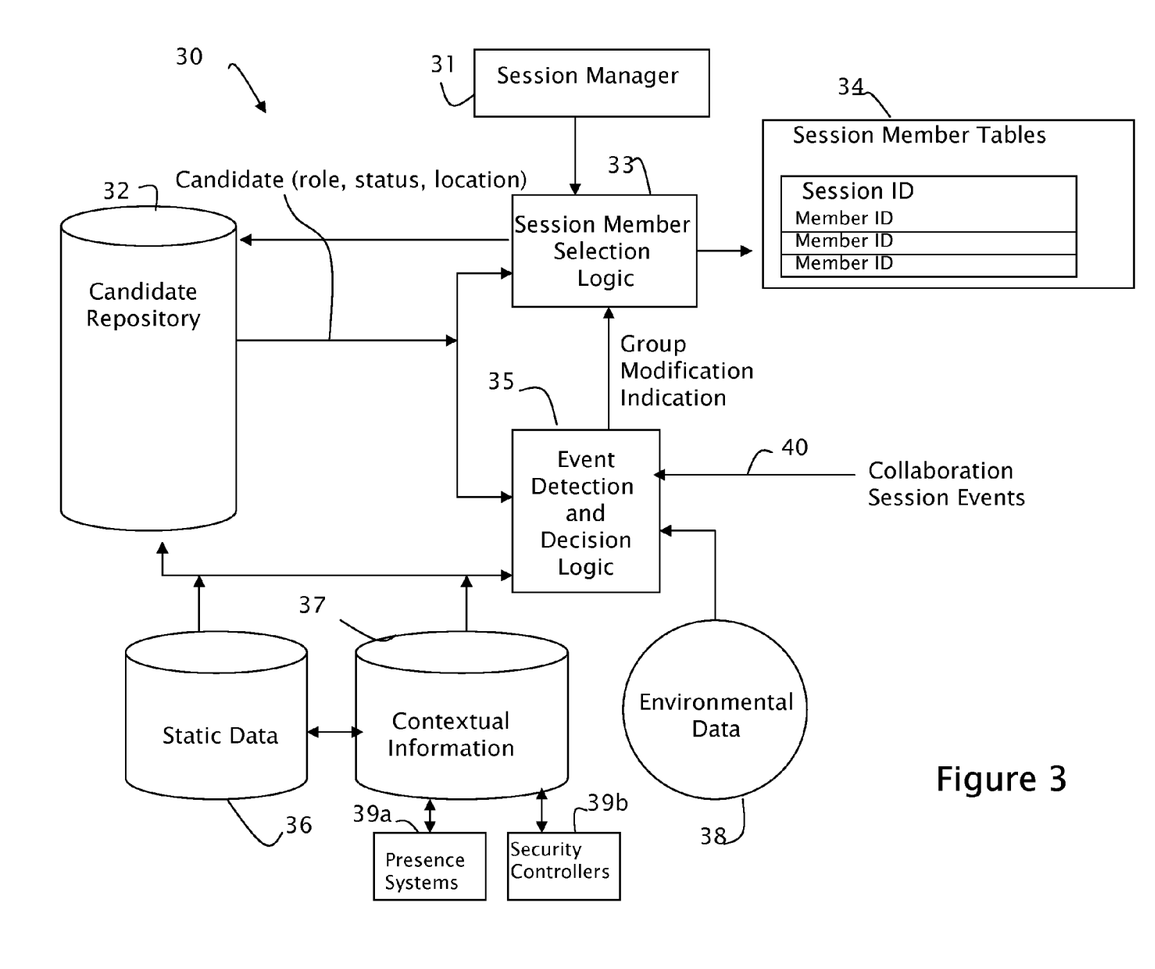
FIG. 3 is a more detailed diagram illustrating exemplary components that may be included in one embodiment of the dynamic group membership management service of FIG. 1.

Referring now to FIG. 3, an exemplary embodiment of a group membership management service 30 is shown to include a candidate repository 32, coupled to session member selection logic 33 and event detection and decision logic 35. As described with regard to FIG. 1, the event detection and decision logic 35 may also be coupled to various repositories, such as a static data repository (or other knowledge base) 36, a contextual information repository 37 and environmental data monitoring logic 38. In addition event detection logic 35 may also receive indications 40 from collaborative services regarding changes in the collaboration session characteristics including changes to workflows, purpose and/or nature of collaborations. The event detection logic 35 may determine whether changes in collaboration characteristics should result in modification of group membership for a collaborative session.

In the embodiment of FIG. 3, the candidate repository 32 stores data structures for each of a plurality of candidates that are available to a collaboration session. The candidates may be known candidates, for example, included on a distribution list or the like, or the candidates may be 'discovered' for example as mobile candidates which come into range of a collaboration session. In one embodiment, the candidate repository stores context information for each candidate. The context information is periodically updated, for example by the context information data base 37 (which receives input from presence logic 39a and security controller 39b), static data base 36 and environmental monitoring logic 38. As mentioned above, an example of context information that may be stored for each candidate includes role, security status and location information.

The session member selection logic 33 operates during session initialization in response to commands from the session manager 31 to generate member tables 34 for each session. In one embodiment, each member table stores identifiers of each group member of each session. Messages and collaborations that are exchanged within the group may be tagged using the identifiers to assist the user in protecting security and data integrity of separate collaboration session and sub-session workflows. The member table may also store other information such as the role, security status or location of the member, although this is not required.

The session member selection logic 33 also operates to modify session member tables in accordance with a Group Modification Indication forwarded from the Event Detection and Decision Logic 35. The Group Modification Indication in one embodiment is an indication or command that is forwarded from the event detection logic 35 to cause the selection logic to remove or add a candidate from a session, or to merge a session and its group with another session or dissolve a session in response to situational inputs.

Figure 4:
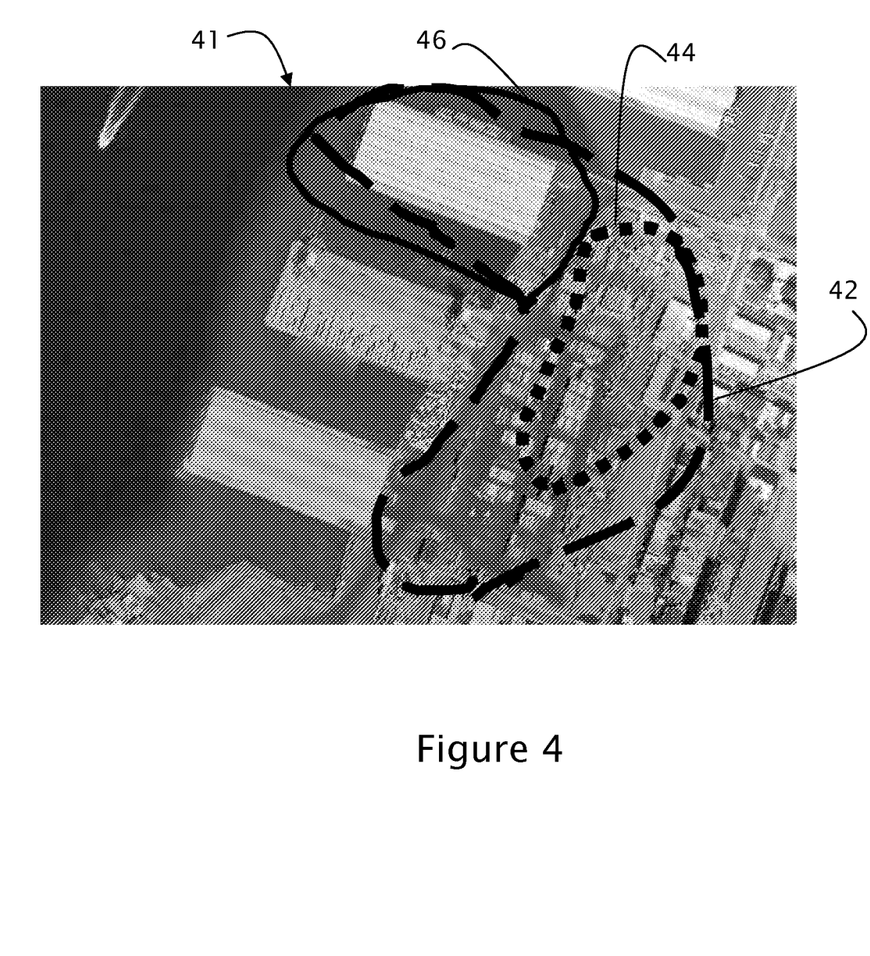
FIG. 4 is a diagram provided to illustrate an exemplary interface that may be employed by the group membership management service of the present invention to dynamically form group sub-sets, merge groups and perform other dynamic group membership modifications.
Figure 5:
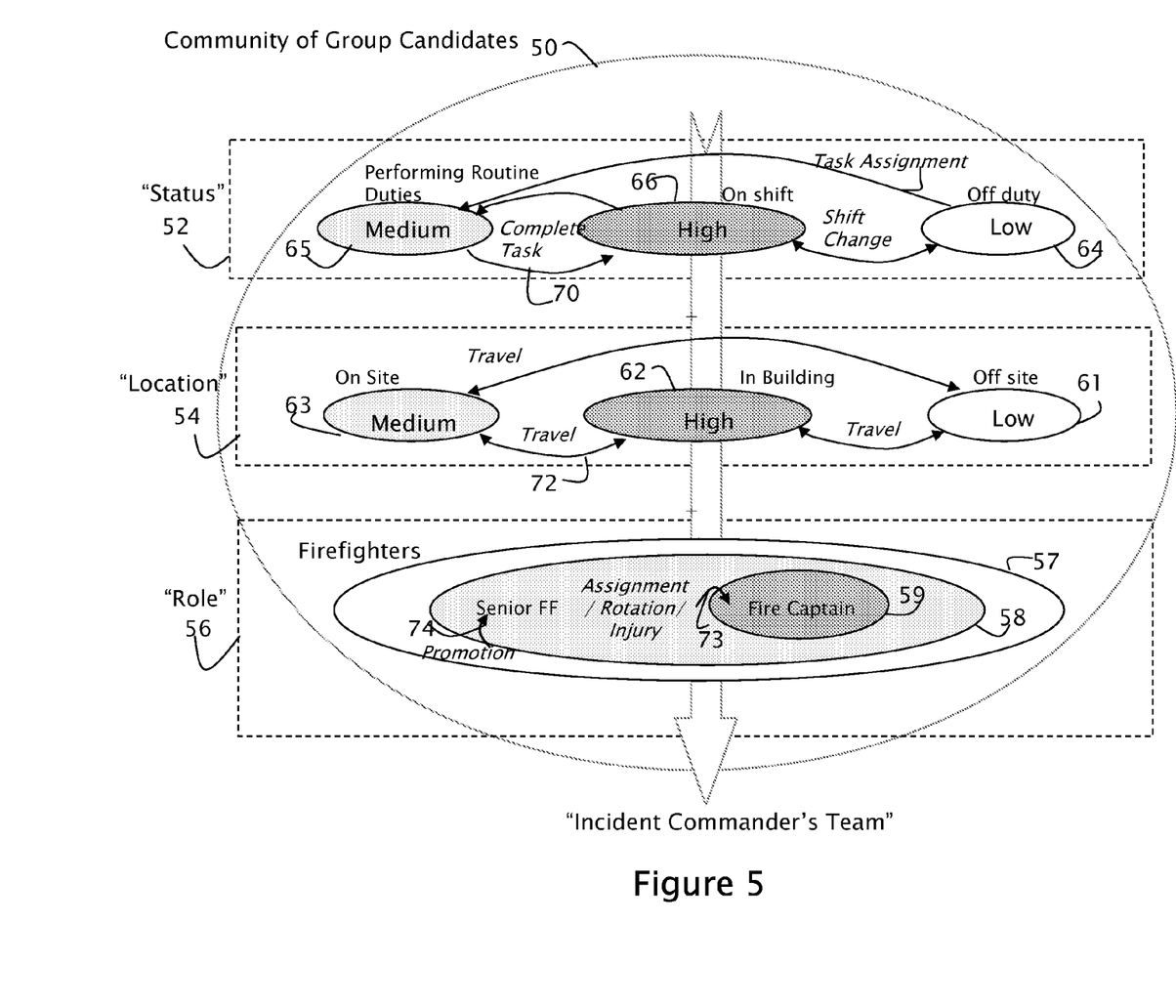
FIG. 5 is a state diagram provided to illustrate how changes in dynamic situational information for a group candidate may results in modification of group membership.

In one embodiment, the session manager 31 may also generate additional collaboration or communication sessions, building upon group information from existing sessions. For example, the session manager may identify a sub-group within the group of candidates in a session to receive specialized communications. Referring briefly to FIG. 4, a diagram is shown of a map 40 of a location requiring emergency collaboration. A session manager may select an initial group of members for receiving communications, with the first group being indicated by the dashed line 52 in FIG. 4. The session manager may seek to identify a sub-group, within the initial group, for example that may receive a first communication including safe exit directions. The sub-group is indicated by the dotted line 52 in FIG. 4. A second sub-group, indicated by solid line 54 may receive different communications regarding a different exit path to safety. Environmental information provided within the location associated with the session 52 may be used to control the selection of members for the particular groups. In an alternate embodiment, a collaborative session between candidates may be initiated by manually selecting candidate bounds based on any of the situational information, such as location, roles or status, other group membership, to identify groups and subgroups. For example, in FIG. 4 the groups may be actively selected using a pen on a touch pad to circle the different groups. Referring now to FIG. 5, a state diagram is provided to illustrate how changes in dynamic context of a group candidate may results in modification to group membership for the candidate.

The oval 50 includes the set of all group candidates for a session. Each of the candidates has an associated status attribute 52, location attribute 54 and role attribute 56. The combination of attributes is analyzed by the session member selection logic to select appropriate candidates as members for the session. Each attribute may have a plurality of states, with each state of the attribute making the candidate more or less attractive to the collaboration. FIG. 5 illustrates exemplary attribute states, with the more desirable attribute states for the particular session being shaded darker than less desirable attribute states. It is noted that attribute states may have different priorities in different types of cooperative sessions.

In the example of FIG. 5, assume that a collaboration service is assembling an incident response team of Firefighters. Each Fire fighter has a 'role', which may be obtained, for example, from an employee knowledge base. An incident response team may therefore require a group of firefighters (represented by set 57), a second number of senior firefighters (represented by set 58) and a third number of captains (represented by set 59).

The location is another context attribute that is evaluated when selecting a group. Candidates that are off site (represented by state 61) are less desirable than candidates that are on site (represented by state 63) for a particular session. Candidates that are on site are less desirable than candidates that are in the building (represented by state 62).

Status is another context that is evaluated when selecting group members. The status used in this example is a work status, although it is appreciated that the status that is evaluated will vary depending upon the particular workflow and resources. A firefighter that is off-duty (represented by state 64) is less desirable than a firefighter that is on-duty but performing tasks (represented by state 65). A fire fighter performing routine tasks is less desirable than one that is on the current shift (represented by state 66).

The present invention recognizes that a candidates context can change, making the candidate more or less useful to the collaboration, and more or less vital to the communication. For example, a firefighter that completes a task at step 70 becomes part of the available group of resources in set 66. A firefighter that travels from off-site into the building is automatically detected according to the present invention, and added into the group, enabling improved response time to the incident. Similarly, as firefighters move away from the building, it is no longer important that they receive communications, and thus the change in location context triggers a drop of that resource from the group, eliminating wasteful use of communication resources.

Moreover, situation needs which contributed to the original group membership criteria (desired attributes) may change—this is also an "event" responded to by decision logic 35, and resulting in reassessment of group membership.

Similarly, events such as an injury or shift rotation (as shown by arrow 73) can be quickly detected and collaboration efforts can be quickly redirected to the appropriate resources. Any changes to static knowledge bases, for example due to promotions and the like, similarly may cause group membership to be reconsidered.

Accordingly a group membership management method and system have been shown and described that enhances existing communications and collaborative sessions by making the sessions responsive to environmental and contextual modifications that affect the session participants. The present invention may advantageously be used to complete tasks of a collaborative session as efficiently, effectively or quickly as possible or combinations thereof by rapidly identifying appropriate resources and filtering the use of resources based on current needs of the collaborative session.

Figure 6:
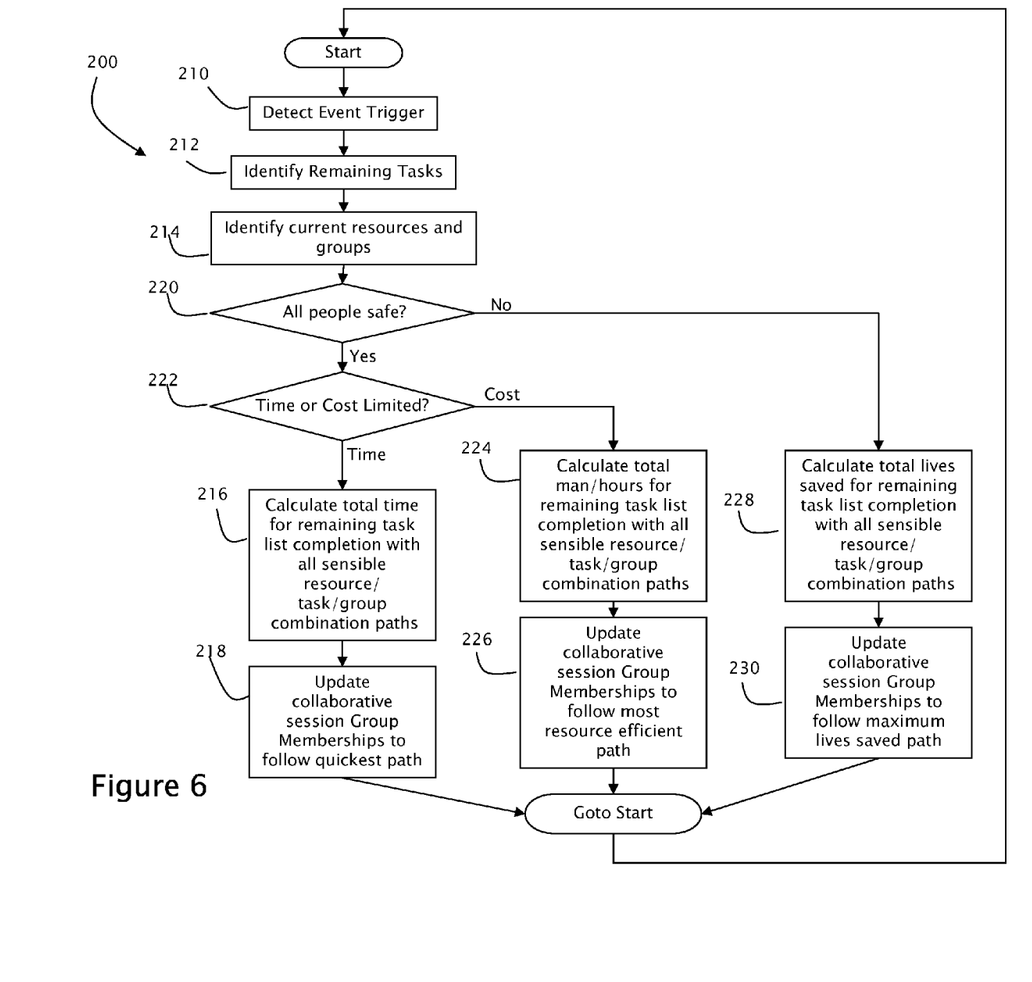
FIG. 6 is a flow diagram that illustrates several exemplary steps that may be performed by group membership selection logic of the present invention to modify group membership among a plurality of simultaneously operating collaborative sessions in accordance with dynamic situational information to enable optimal performance of each collaborative session.

The present invention is also ideally suited for optimizing resource allocation among a plurality of parallel collaborative sessions because it enables fast detection of resource availability redirection of resource support. For example, FIG. 6 is a non limiting flow diagram illustrating exemplary steps of a process 200 that may be performed by group membership selection logic of the present invention. In the simplistic example of FIG. 6 it is assumed that the goals of the decision making entity 35 may be changed by incoming events between three basic independent algorithms, minimum cost, minimum time or maximum lives saved for all collaborative workflows. However, it is envisioned that more typically each decision making entity may have a variety of goals, many of which may conflict, and it is recognized that the conflicting nature of the goals and choices made by the decision entity will vary greatly depending upon the individual collaborations and resources. Thus it should be appreciated that the example of FIG. 6 is provided merely as an illustration of how a decision making entity may analyze collaboration session events and candidate situational information to dynamically modify collaboration group membership and how situational information may modify the decision making criteria used within the decision making entity.

At step 202 a situational event is detected. The situational event may impact one or more collaboration sessions; for example a new criteria for group membership for the collaborative session may be introduced. For example, in an emergency response situation it may be determined that a foreign language specialist is required. Or a collaboration session could be completed, making the resources of the collaboration group available to other collaborations. Thus at step 212 the decision making entity may identify each known collaboration session, sub-session or task. At step 214 the decision making entity may identify each resource and current groups, and review current context information for the resource. At step 220 and 222 determine which of 3 simplistic options, minimum time, minimum resources or maximum lives saves is the best group membership determination algorithm that is best for the current situation. Depending on the results of the operation mode decisions 220 and 222, at step 216, 224 or 228 the decision making entity may calculate, for all combinations of collaborative sessions and resource pairings, a predicted total time, total man-hours, or total lives saved for the completion of all tasks, and aligning resources with tasks for an optimal solution. At step 218, 226 or 230 the group membership for each session would be updated with the results obtained by the decision making entity.

Various information may be maintained to assist the decision making entity when determining whether to modify group membership. The information includes task related information, such as a minimum size group for a particular task, average time to task completion, and an average ramp up time (resulting from role delegation, teaching time, travel) until a resource can effectively participate in a task. The information also includes resource related information, such as team history and familiarity of potential resources, team efficiency curves, and multi-tasking abilities of the resources. Task related information and resource related information may be learned by the decision making entity, or may be provided for use by a network administrator that monitors resource behavior. The task related information and resource related information is analyzed in conjunction with the situational information to enable the decision making entity to best determine whether group membership modifications are desirable in view of the goals of the collaboration system. It should be understood that it may not be necessary to revisit the group membership of all collaborative sessions for each detected event. The decision making entity may include logic for identifying which of the collaborative session may benefit from group membership modification, for example group membership modification may be considered only for those collaborative sessions having resources that are related to the situational information that triggers the event.

Accordingly a method and apparatus has been shown and described for dynamically managing membership of a collaborative group. Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); and (b) information alterably stored on writable storage media (e.g. floppy disks and hard drives).

The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A computer program product, comprising a non-transitory computer usable medium having a computer readable program code embodied therein, said computer readable program code adapted to be executed to implement a method for managing membership in a collaboration session, said method comprising:
   selecting candidates from a plurality of group candidates to become associated with the collaborative session based on situational information associated with collaborative purpose and contextual information associated with the group candidates;
   associating the selected group candidates with the collaboration session;
   monitoring situational information associated with collaborative purpose to detect a situational trigger; and
   selectively modifying membership of the collaborative session in response to the situational trigger by adding an unassociated group candidate as a member or removing an associated group candidate as a member without terminating the collaboration session.

2. The method of claim 1 wherein the situational information includes at least one of collaboration session characteristics and environmental information.

3. The method of claim 2 wherein the situation trigger is a change in collaboration session characteristic that affects group membership criteria.

4. The method of claim 2 wherein the situational trigger is a change in environmental information associated with the collaboration session.

5. The method of claim 2 wherein the contextual information includes at least one of a role of the group candidate, a status of the group candidate and a location of the group candidate.

6. The method of claim 1 further comprising identifying membership criteria for a new session, the new session related to the collaboration session, and wherein the membership criteria of the new session includes at least one of the group candidates of the collaboration session.

7. The method of claim 6, wherein the membership criteria of the new session includes a new group candidate in the new session, the new group candidate being in addition to group candidates of the collaboration session.

8. The method of claim 7 wherein the membership criteria of the new session includes fewer than all of the group candidates of the collaboration session in the new session.

9. The method of claim 1 wherein the step of selectively modifying a membership automatically modifies membership of the collaboration session.

10. The method of claim 1 wherein the step of modifying membership forwards a notification of change in membership to a manager of the collaboration session.

11. The method of claim 1 wherein the group candidate is selected from a group including a human, animal and inanimate resource.

12. The method of claim 1 wherein the step of selectively modifying a membership operates in response to one of a policy, inference algorithm and heuristic.

13. The method of claim 1 wherein the situational trigger is a new task or a change in an existing task.

14. An apparatus for controlling group candidate membership in a collaboration session includes:
   means for selecting candidates from a plurality of group candidates to become associated with the collaborative session based on situational information associated with collaborative purpose and contextual information associated with the group candidates;
   means for associating the selected group candidates with the collaboration session;
   means for monitoring situational information associated with the collaborative purpose;
   event detection logic for detecting changes to the situational information and
   membership modification logic for selectively modifying membership of group candidates in response to detection of a change by the event detection logic by adding an unassociated group candidate as a member or removing an associated group candidate as a member without terminating the collaboration session.

15. The apparatus of claim 14 wherein the contextual information includes at least one of a role of the group candidate, a status of the group candidate and a location of the group candidate.

16. The method of claim 15 wherein the event detection logic detects a change in at least one of collaboration session characteristics and environmental information.

17. The method of claim 15 wherein the event detection logic detects a change in collaboration session characteristic that affects group membership criteria.

18. The method of claim 15 wherein the event detection logic detects a change in environmental information associated with the collaboration session.

19. The apparatus of claim 14 wherein the membership modification logic selectively deletes group candidates from the collaboration session.

20. A computer program product, comprising a non-transitory computer usable medium having a computer readable program code embodied therein, said computer readable program code adapted to be executed to implement a method for controlling group membership in each of a plurality of collaboration sessions, said method comprising:
   detecting a triggering event, the triggering event being associated with a change in purpose, scope, workflow, duration, or membership criteria of one of the plurality of collaboration sessions; and
   selectively modifying group membership of the plurality of collaboration sessions in response to the triggering event by adding an unassociated group candidate as a member or removing an associated group candidate as a member without terminating the collaboration sessions.

21. The method of claim 20 wherein the step of detecting a triggering event includes the step of detecting a change in environmental information.

22. The method of claim 20 wherein the step of selectively modifying further operates in response to task information, the task information being associated with the plurality of collaboration sessions.

23. The method of claim 22 wherein the task information comprises historical information.

24. The method of claim 22 wherein the step of selectively modifying group membership operates to modify a first group membership of a first collaboration service by performing at least one of adding the group candidate to the first group membership, deleting the group candidate from the first group membership, deleting the first group membership, merging the first group membership with a second group membership and generating a sub-group within the first group membership.

* * * * *